(12) United States Patent
Suzuki (10) Patent No.: US 7,626,636 B2
(45) Date of Patent: Dec. 1, 2009

(54) ELECTRONIC APPARATUS AND BROADCAST STANDARD DETERMINATION METHOD

(75) Inventor: Toshiyuki Suzuki, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 784 days.

(21) Appl. No.: 11/397,249

(22) Filed: Apr. 4, 2006

(65) Prior Publication Data
US 2006/0238651 A1 Oct. 26, 2006

(30) Foreign Application Priority Data
Apr. 26, 2005 (JP) ............................. 2005-128388

(51) Int. Cl.
H04N 5/46 (2006.01)
H04N 5/455 (2006.01)
H04N 5/50 (2006.01)

(52) U.S. Cl. .................. 348/558; 348/726; 348/731

(58) Field of Classification Search ................ 348/558, 348/555, 553, 725–728, 731–733; H04N 5/46, H04N 5/44, 5/455, 5/50
See application file for complete search history.

(56) References Cited

U.S. PATENT DOCUMENTS

| | | | |
|---|---|---|---|
| 4,240,102 A * | 12/1980 | Groeneweg | .............. 348/558 |
| 5,083,205 A | 1/1992 | Arai | |
| 5,673,088 A | 9/1997 | Nah | |
| 5,959,700 A | 9/1999 | Arikane et al. | |
| 7,437,577 B2 * | 10/2008 | Obara et al. | ................ 713/300 |

FOREIGN PATENT DOCUMENTS

| | | |
|---|---|---|
| CN | 1089516 C | 8/2002 |
| EP | 0 409 562 A | 1/1991 |
| JP | 06-335005 | 12/1997 |
| JP | 11-127440 | 5/1999 |
| JP | 2004-173298 | 6/2004 |
| JP | 2004-208143 | 7/2004 |

OTHER PUBLICATIONS

English Translation of Chinese Office Action dated Jun. 13, 2008.

* cited by examiner

*Primary Examiner*—Sherrie Hsia
(74) *Attorney, Agent, or Firm*—Knobbe, Martens, Olson & Bear, LLP (57) ABSTRACT

According to one embodiment, an electronic apparatus includes a receiver which receives a broadcast signal, a demodulator which filters the received broadcast signal using a filtering characteristic, and separates the received broadcast signal into a video signal and an audio signal, a video decoder which executes a process for detecting frequencies of a vertical sync signal, a horizontal sync signal and a color sub-carrier signal from the video signal which is output from the demodulator, a unit which selects, from the plurality of kinds of filtering characteristics, a filtering characteristic which enables the video decoder to detect the vertical sync signal, the horizontal sync signal and the color sub-carrier signal, and a unit which determines the kind of the broadcast standard corresponding to the received broadcast signal, based on the selected kind of filtering characteristic and the detected frequencies.

10 Claims, 7 Drawing Sheets

ELECTRONIC APPARATUS AND BROADCAST STANDARD DETERMINATION METHOD

CROSS-REFERENCE TO RELATED APPLICATIONS

This application is based upon and claims the benefit of priority from Japanese Patent Application No. 2005-128388, filed Apr. 26, 2005, the entire contents of which are incorporated herein by reference.

BACKGROUND

1. Field

One embodiment of the invention relates to an electronic apparatus which receives a broadcast signal, and to a broadcast standard determination method for use in the apparatus.

2. Description of the Related Art

In recent years, various types of portable personal computers, such as a notebook computer and a laptop computer, have been developed. Recently, in order to improve audio/video (AV) functions in these computers, tuners for receiving TV broadcast signals have been mounted in the computers more and more.

In many regions of the world, however, various broadcast standards (also referred to as "TV broadcast standards") are currently adopted. Each broadcast standard is basically defined by the kind of color system (e.g. NTSC (National Television Standards Committee), PAL (Phase Alternate Line), SECAM (Sequential Couleur Avec Memoire)) and the kind of broadcast system (e.g., M, B, G, H, I, D, K, L) that is stipulated by the ITU (International Telecommunication Union).

For example, the broadcast standard that is adopted in Japan and North America is NTSC-M, and the broadcast standard that is adopted in Germany, etc. is PAL-B/G. In some regions, broadcast signals corresponding to a plurality of broadcast standards are used.

Under the circumstances, so-called worldwide tuners, which can receive a plurality of kinds of TV broadcast signals corresponding to a plurality of kinds of broadcast standards, have recently been developed.

A user can view/listen to a desired TV broadcast signal by selecting the kind of broadcast standard that is to be received by a tuner.

However, in a region where services using TV broadcast signals corresponding to a plurality of kinds of broadcast standards are provided, there may be a case in which the kind of receivable broadcast standard varies from frequency channel to frequency channel. Thus, there is a demand for a function that automatically determines the kind of receivable broadcast standard.

Jpn. Pat. Appln. KOKAI Publication No. 2004-208143 discloses a TV signal processing apparatus that supports a plurality of kinds of broadcast standards. The TV signal processing apparatus has a function of automatically determining the broadcast standard of a broadcast signal, by processing a video signal that is obtained by demodulating the broadcast signal.

In the apparatus of KOKAI No. 2004-208143, however, it is presupposed that the video signal that is obtained by the demodulation process is always normal. If a normal video signal is not obtained by the demodulation process, it is difficult to correctly determine the broadcast standard.

In addition, in the technique of KOKAI No. 2004-208143, dedicated hardware is used for determining the broadcast standard. Consequently, the number of components increases.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus includes a receiver which receives a broadcast signal of a predetermined frequency band, a demodulator which filters the received broadcast signal using a filtering characteristic which is set in the demodulator, and separates the received broadcast signal into a video signal and an audio signal, a video decoder which executes a process for detecting frequencies of a vertical sync signal, a horizontal sync signal and a color sub-carrier signal which are included in the video signal which is output from the demodulator, a filtering characteristic control unit which refers to a result of the detecting process by the video decoder, while changing the filtering characteristic set in the demodulator among a plurality of kinds of filtering characteristics corresponding to a plurality of kinds of broadcast systems, thereby selecting, from the plurality of kinds of filtering characteristics, a filtering characteristic which enables the video decoder to detect the vertical sync signal, the horizontal sync signal and the color sub-carrier signal, and a broadcast standard determination unit which determines the kind of the broadcast standard corresponding to the received broadcast signal, based on the selected kind of filtering characteristic and the frequencies of the vertical sync signal, the horizontal sync signal and the color sub-carrier signal which are detected by the video decoder.

Figure 1:
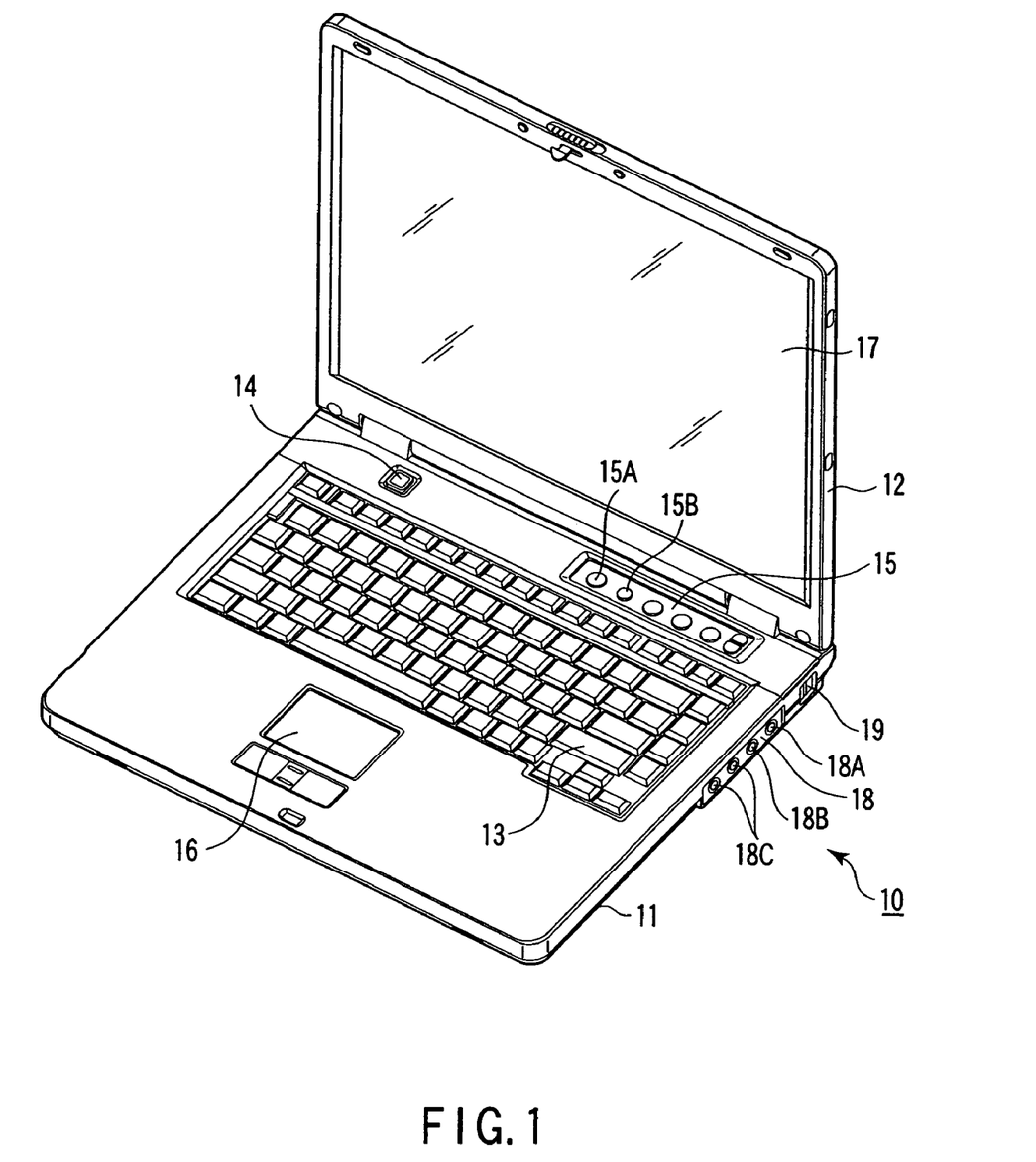
FIG. 1 is an exemplary perspective view that shows an example of the external appearance of a computer according to an embodiment of the invention.
Figure 2:
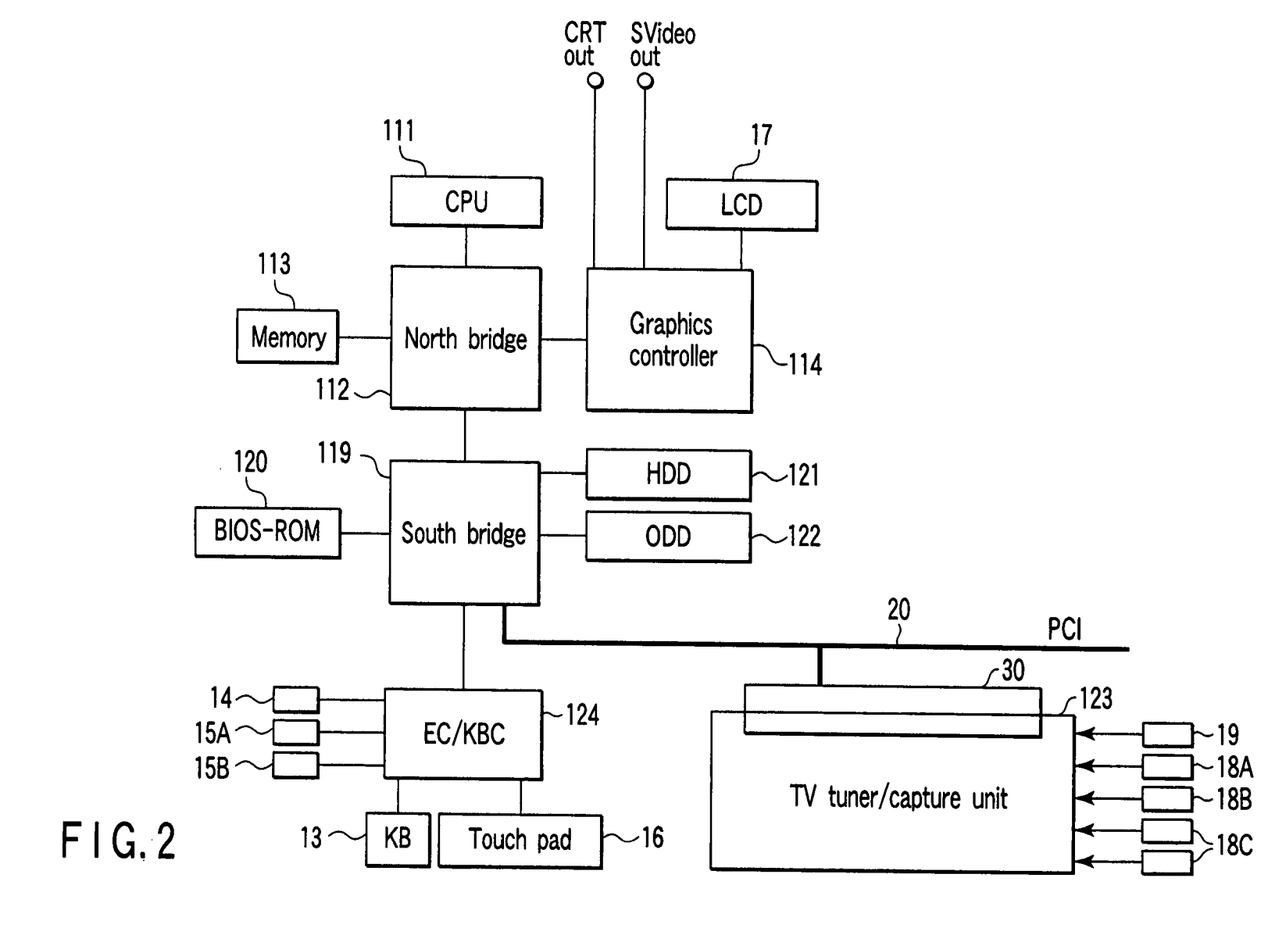
FIG. 2 is an exemplary block diagram that shows an example of the system configuration of the computer shown in FIG. 1.

Referring to FIG. 1 and FIG. 2, the structure of the electronic apparatus according to the embodiment of the invention is described. The electronic apparatus is realized, for example, as a notebook personal computer 10.

FIG. 1 is a perspective view showing the notebook personal computer 10 in the state in which a display unit thereof is opened. The computer 10 comprises a computer main body 11 and a display unit 12. A display device that is composed of an LCD (Liquid Crystal Display) 17 is built in the display unit 12. The display screen of the LCD 17 is positioned at an approximately central part of the display unit 12.

The display unit 12 is attached to the computer main body 11 such that the display unit 12 is freely rotatable between an open position and a closed position. The computer main body 11 has a thin box-shaped casing. A keyboard 13, a power button 14 for powering on/off the computer 10, an input operation panel 15 and a touch pad 16 are disposed on the top surface of the computer main body 11.

The input operation panel 15 is an input device that inputs an event corresponding to a pressed button. The input operation panel 15 has a plurality of buttons for activating a plurality of functions. The buttons include a TV activation button 15A and a channel switch button 15B. The TV activation button 15A is a button for reproducing TV broadcast program data. When the TV activation button 15A is pressed by the user, a TV application program is automatically started. The TV application program is a video reproduction program for viewing/listening to and recording TV broadcast program data. The channel switch button 15B is a button for selecting a channel of TV broadcast program data that is to be viewed/listened to, or to be recorded. Each time the channel switch button 15B is pressed by the user, the channel of TV broadcast program data that is to be viewed/listened to or recorded is changed in succession.

The side surface of the computer main body 11 is equipped with an AV (Audio-Video) connector set 18 and a TV antenna connector 19. A TV antenna cable is connected to the TV antenna connector 19. The AV (Audio-Video) connector set 18 is a set of connectors for receiving AV data from an external device. The AV connector set 18 includes a composite video input connector 18A, an S-video input connector 18B, and two audio input connectors (audio-L, audio-R) 18C.

Next, referring to FIG. 2, the system configuration of the computer 10 is described.

The computer 10, as shown in FIG. 2, comprises a CPU 111, a north bridge 112, a main memory 113, a graphics controller 114, a south bridge 119, a BIOS-ROM 120, a hard disk drive (HDD) 121, an optical disc drive (ODD) 122, a TV tuner/capture unit 123, and an embedded controller/keyboard controller IC (EC/KBC) 124.

The CPU 111 is a processor that is provided for controlling the operation of the computer 10. The CPU 111 executes an operating system (OS) and various application programs, which are loaded in the main memory 113 from the hard disk drive (HDD) 121. As the application programs, a tuner control program, as well as the above-mentioned TV application program, is used. The tuner control program is a program for controlling the operation of the TV tuner/capture unit 123. The tuner control program executes a broadcast standard determination process for automatically determining a broadcast standard of a broadcast signal which is receivable by the TV tuner/capture unit 123.

The tuner control program includes, as its functional modules, a filtering characteristic control unit and a broadcast standard determination unit. The filtering characteristic control unit executes a filtering characteristic setting process that selects, from a plurality of kinds of filtering characteristics, a filtering characteristic which enables a video decoder in the TV tuner/capture unit 123 to detect a vertical sync signal, a horizontal sync signal and a color sub-carrier signal. The broadcast standard determination unit determines the kind of broadcast standard corresponding to a broadcast signal, which is received by the TV tuner/capture unit 123, on the basis of the kind of filtering characteristic that is selected by the filtering characteristic setting process, and the frequencies of the vertical sync signal, horizontal sync signal and color sub-carrier signal that are detected by the video decoder.

Since the tuner control program is executed by the CPU 111, the CPU 111 functions as the filtering characteristic control unit and broadcast standard determination unit. Needless to say, each of the filtering characteristic control unit and broadcast standard determination unit may be realized by dedicated hardware.

The CPU 111 executes a system BIOS (Basic Input/Output System) that is stored in the BIOS-ROM 120. The system BIOS is a program for hardware control.

The north bridge 112 is a bridge device that connects a local bus of the CPU 111 and the south bridge 119. The north bridge 112 includes a memory controller that access-controls the main memory 113. The north bridge 112 has a function of executing communication with the graphics controller 114 via, e.g. an AGP (Accelerated Graphics Port) bus.

The graphics controller 114 is a display controller for controlling the LCD 17 that is used as a display monitor of the computer 10. The graphics controller 114 includes a video memory (VRAM) and generates a video signal, which forms a display image to be displayed on the LCD 17, on the basis of display data that is written in the video memory (VRAM) by the OS/application program. The graphics controller 114 also includes an interface for outputting an analog video signal to an external CRT (Cathode-Ray Tube), and an interface for outputting an analog video signal to the outside via the S-video output connector.

The south bridge 119 controls each device on an LPC (Low Pin Count) bus. The south bridge 119 includes an IDE (Integrated Drive Electronics) controller for controlling the HDD 121 and ODD 122. The south bridge 119 also includes a function of access-controlling the BIOS-ROM 120 and a function of controlling each device on a PCI (Peripheral Component Interconnect) bus 20. The TV tuner/capture unit 123 is connected to the PCI bus 20.

The TV tuner/capture unit 123 is connected to the PCI bus 20 via a bus connector 30. The bus connector 30 comprises, e.g. a Mini PCI connector. The TV tuner/capture unit 123 is a tuner device that receives a TV broadcast signal. The TV tuner/capture unit 123 can also receive video data from an external device. The TV tuner/capture unit 123 receives a TV broadcast signal and outputs a video signal and an audio signal, which are included in the received TV broadcast signal, to the PCI bus 20. In this case, the video signal and audio signal are compression-encoded in the TV tuner/capture unit 123 using a compression-encoding scheme such as MPEG2 (MPEG: Moving Picture Coding Experts Group). The compression-encoded video signal and audio signal are output to the PCI bus 20. The compression-encoded video signal and audio signal are then decoded by the TV application program.

The embedded controller/keyboard controller IC (EC/KBC) 124 is a 1-chip microcomputer in which an embedded controller for power management and a keyboard controller for controlling the keyboard (KB) 13 and touch pad 16 are integrated. The embedded controller/keyboard controller IC (EC/KBC) 124 has a function of powering on/off the computer 10 in response to the user's operation of the power button 14.

Figure 3:
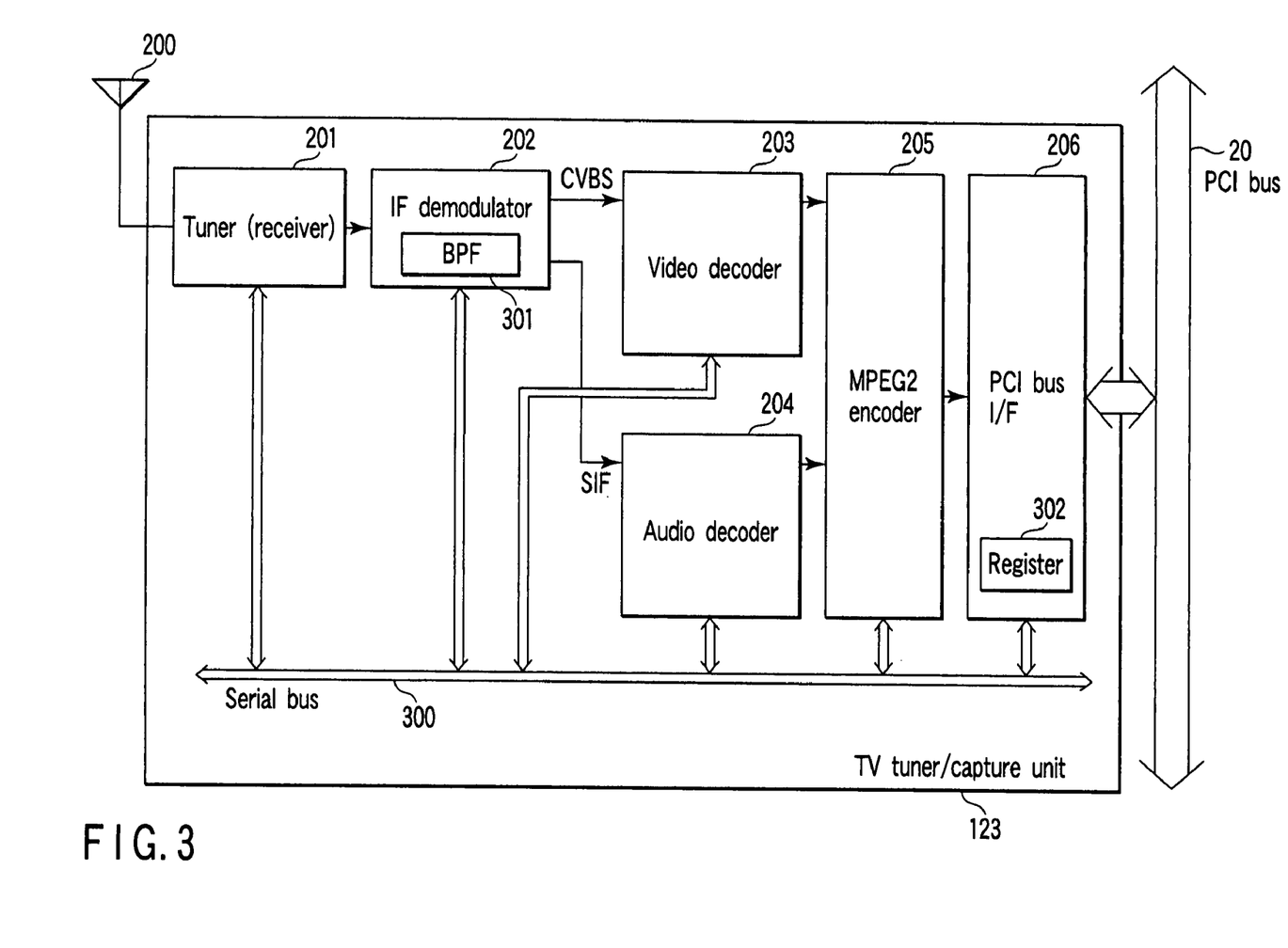
FIG. 3 is an exemplary block diagram that shows an example of the structure of a TV tuner/capture unit which is provided in the computer shown in FIG. 1.

Next, referring to FIG. 3, the structure of the TV tuner/capture unit 123 is described.

The TV tuner/capture unit 123 comprises a tuner 201, an intermediate frequency (IF) demodulator 202, a video decoder 203, an audio decoder 204, an MPEG2 encoder 205, and a PCI bus interface 206. The tuner 201, intermediate frequency (IF) demodulator 202, video decoder 203, audio decoder 204, MPEG2 encoder 205 and PCI bus interface 206 are connected to a serial bus 300. The tuner control program, that is, the CPU 111, sets various commands in a register 302 that is provided in the PCI bus interface 206, thus being able to control the operations of the tuner 201, intermediate frequency (IF) demodulator 202, video decoder 203, audio decoder 204 and MPEG2 encoder 205.

The tuner 201 is connected to an external antenna 200 via the TV antenna connector 19 so as to receive a TV broadcast signal which carries a video signal and an audio signal. The tuner 201 is a receiver that receives a TV broadcast signal in a predetermined frequency band. The frequency band that is to be received can be varied under the control of the TV application program or tuner control program. The tuner 201 converts the received TV broadcast signal to an intermediate frequency signal, and outputs the intermediate frequency signal.

The IF demodulator 202 is a demodulator for demodulating the TV broadcast signal, which is received by the tuner 201. The IF demodulator 202 filters the TV broadcast signal that is received by the tuner 201, specifically, the intermediate frequency signal output from the tuner 201, and separates the received TV broadcast signal into a video signal and an audio signal. The IF demodulator 202 includes a band-pass filter (BPF) 301. The band-pass filter (BPF) 301 executes the filtering for demodulating the TV broadcast signal. By the filtering, the TV broadcast signal is separated into a video signal (video intermediate-frequency signal) and an audio signal (audio intermediate-frequency signal).

The filtering characteristic of the band-pass filter (BPF) 301 can be changed under the control of the tuner control program, that is, the CPU 111. Specifically, the tuner control program, that is, the CPU 111, can selectively set in the IF demodulator 202 a plurality of kinds of filtering characteristics, which correspond to a plurality of broadcast systems (e.g. broadcast systems M, B and L defined by the ITU). The IF demodulator 202 filters the TV broadcast signal, which is received by the tuner 201, using the set filtering characteristic, thereby demodulating the TV broadcast signal. The video signal that is output from the IF demodulator 202 is a composite signal (CVBS: Csync Video Black/white Signal), and the audio signal output from the IF demodulator 202 is a SIF (Sound Intermediate Frequency) signal.

The video decoder 203 decodes the video signal that is output from the demodulator 202, and converts the video signal to a digital video signal of, e.g. ITU-656 format. In the decoding process, the video decoder 203 detects the frequencies of the vertical sync signal, horizontal sync signal and color sub-carrier signal, which are included in the video signal output from the demodulator 202.

The audio decoder 204 decodes the audio signal that is output from the demodulator 202, and converts the audio signal to a digital audio signal of, e.g. I2S (Inter-IC Sound Bus) format. In the decoding process, the audio decoder 204 detects the frequency of the audio carrier signal, which is included in the audio signal, thereby to decode the audio signal output from the demodulator 202.

The MPEG2 encoder 205 compression-encodes the ITU-656 format video signal and I2S format audio signal, and generates a compression-encoded AV stream. The compression-encoded AV stream is sent to the memory 113 via the PCI bus interface 206 and PCI bus 20.

Next, a plurality of kinds of filtering characteristics, which are used in the present embodiment, are explained.

Figure 4:
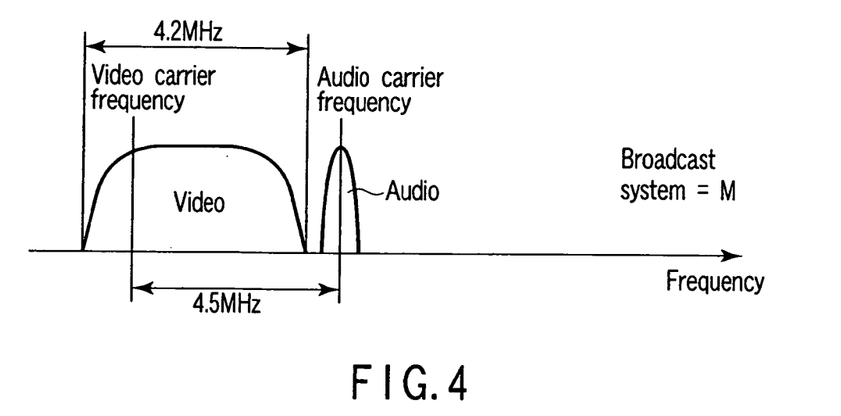
FIG. 4 is an exemplary view for explaining an example of a first filtering characteristic that is used in the computer shown in FIG. 1.

FIG. 4 shows a broadcast signal corresponding to the broadcast system M. In the broadcast system M, the interval between a video carrier frequency and an audio carrier frequency is 4.5 MHz. The band width of the video signal is 4.2 MHz. The filtering characteristic corresponding to the broadcast system M is predetermined on the basis of the frequency characteristics of the video carrier and audio carrier shown in FIG. 4.

Figure 5:
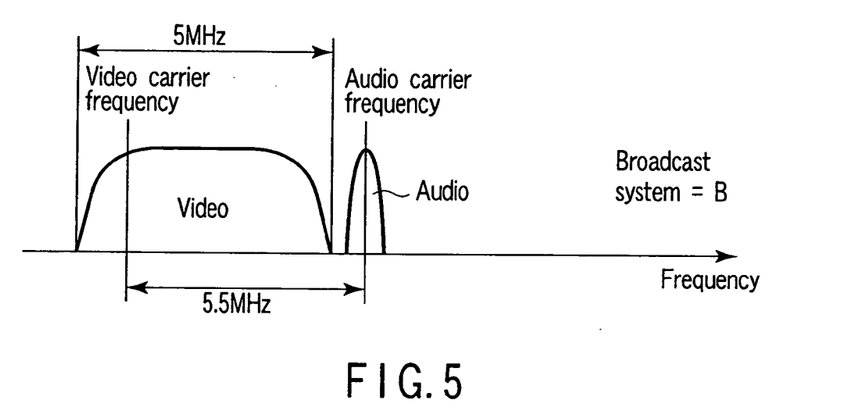
FIG. 5 is an exemplary view for explaining an example of a second filtering characteristic that is used in the computer shown in FIG. 1.

FIG. 5 shows a broadcast signal corresponding to the broadcast system B. In the broadcast system B, the interval between a video carrier frequency and an audio carrier frequency is 5.5 MHz. The band width of the video signal is 5 MHz. The filtering characteristic corresponding to the broadcast system B is predetermined on the basis of the frequency characteristics of the video carrier and audio carrier shown in FIG. 5.

Figure 6:
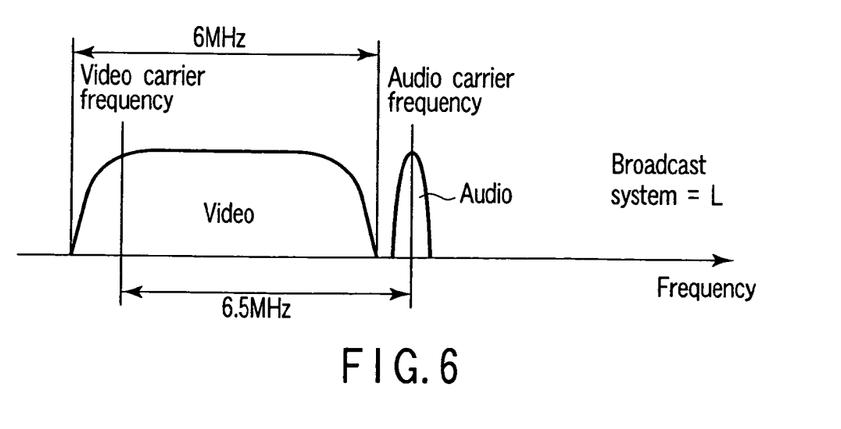
FIG. 6 is an exemplary view for explaining an example of a third filtering characteristic that is used in the computer shown in FIG. 1.

FIG. 6 shows a broadcast signal corresponding to the broadcast system L. In the broadcast system L, the interval between a video carrier frequency and an audio carrier frequency is 6.5 MHz. The band width of the video signal is 6 MHz. The filtering characteristic corresponding to the broadcast system L is predetermined on the basis of the frequency characteristics of the video carrier and audio carrier shown in FIG. 6.

Figure 7:
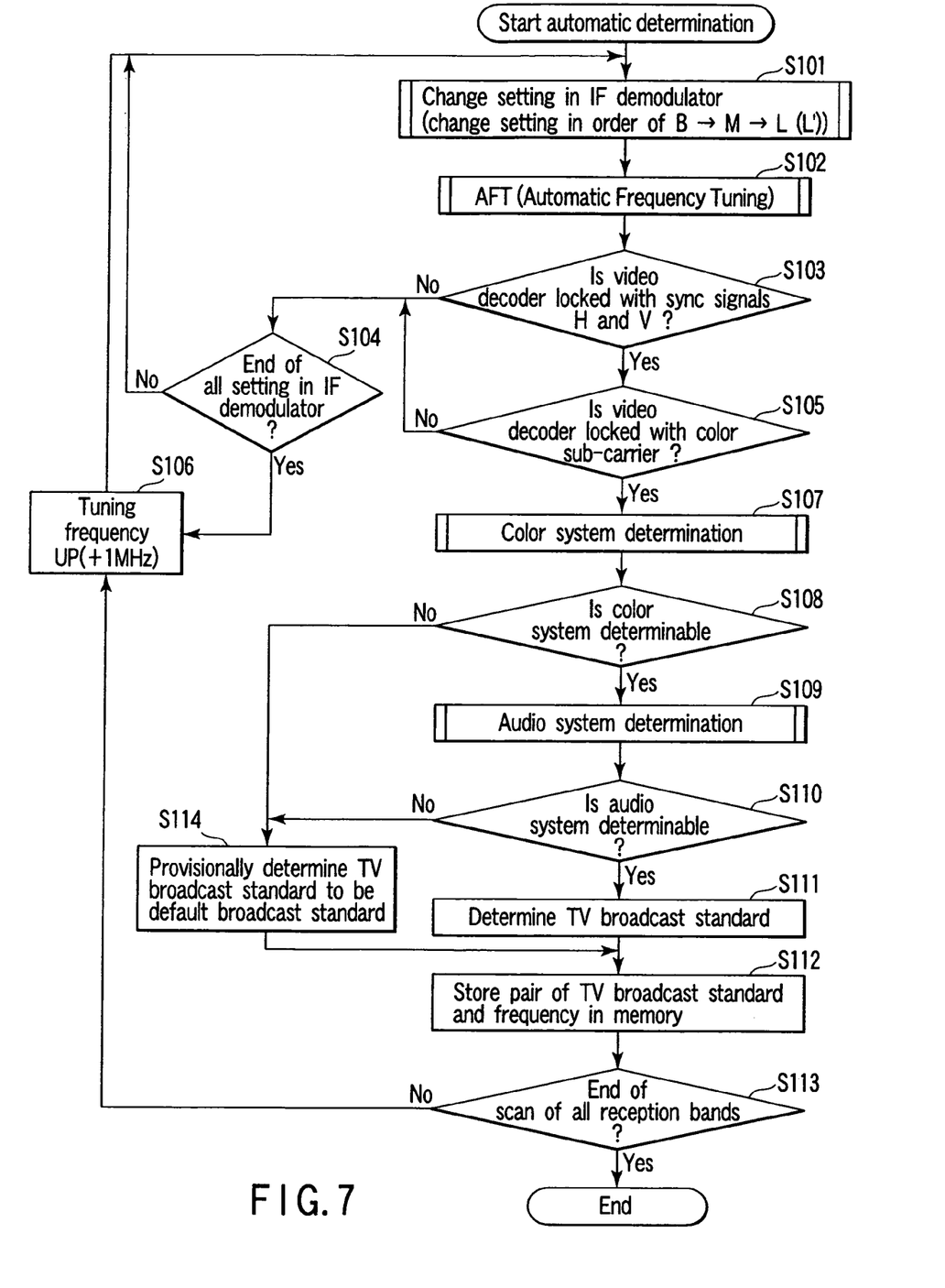
FIG. 7 is an exemplary flow chart for illustrating an example of the procedure of a broadcast standard determination process which is executed by the computer shown in FIG. 1.

Next, referring to a flow chart of FIG. 7, the procedure of the broadcast standard determination process is described.

In the present embodiment, the tuner 201 executes frequency selection for an analog TV broadcast signal which is received by the antenna 200. An intermediate-frequency signal, which is output from the tuner 201, is demodulated (detected) by the IF demodulator 202. Thereby, a CVBS signal (video signal) and a SIF signal (audio signal) are obtained. In this case, if the filtering characteristic, which is set in the IF demodulator 202, does not correspond to the broadcast standard of the received broadcast signal, a normal CVBS signal is not output, and the video decoder 203 at the subsequent stage cannot correctly detect the vertical sync signal (V), horizontal sync signal (H) and color sub-carrier signal.

In this embodiment, to solve this problem, the tuner control program, i.e. CPU 111, first executes a filtering characteristic setting process for selecting, from a plurality of kinds of filtering characteristics corresponding to a plurality of broadcast systems, a filtering characteristic which enables the video decoder 203 to detect the vertical sync signal, horizontal sync signal and color sub-carrier signal, and setting the selected filtering characteristic in the IF demodulator 202.

In the filtering characteristic setting process, the filtering characteristic control unit of the tuner control program, i.e. the CPU 111, determines whether the currently set filtering characteristic is a filtering characteristic that enables the video decoder 203 to detect the vertical sync signal, horizontal sync signal and color sub-carrier signal. The determination is performed by referring to the detection result of the vertical sync signal, horizontal sync signal and color sub-carrier signal by the video decoder 203, while successively changing the filtering characteristic, which is set in the IF demodulator 202, among the plurality of kinds of filtering characteristics.

In the state in which the optimal filtering characteristic is set in the IF demodulator 202, the broadcast standard determination unit of the tuner control program, i.e. the CPU 111, reads the frequencies of the vertical sync signal, horizontal sync signal and color sub-carrier signal which are detected by the video decoder 203, and determines the kind of the broadcast standard of the currently received broadcast signal on the basis of these frequencies and the kind of the currently set filtering characteristic in the IF demodulator 202.

In this embodiment, one of the filtering characteristic corresponding to the broadcast system B, the filtering characteristic corresponding to the broadcast system M and the filtering characteristic corresponding to the broadcast system L (or L') is selectively used as the kind of filtering characteristic to be set in the IF demodulator 202. The filtering characteristic corresponding to the broadcast system B is designed to be able to separate a broadcast signal, which corresponds to, e.g. the broadcast system B, G, etc., into a video signal and an audio signal. The filtering characteristic corresponding to the broadcast system M is designed to be able to separate a broadcast signal, which corresponds to, e.g. the broadcast system M, N, etc., into a video signal and an audio signal. The filtering characteristic corresponding to the broadcast system L (or L') is designed to be able to separate a broadcast signal, which corresponds to, e.g. the broadcast system L (or L'), into a video signal and an audio signal.

The filtering characteristic, which is set in the IF demodulator 202, is successively changed in the order of, e.g. the filtering characteristic corresponding to the broadcast system B, the filtering characteristic corresponding to the broadcast system M and the filtering characteristic corresponding to the broadcast system L (or L').

Actually, the filtering characteristic that is to be set in the IF demodulator 202 is changed in a predetermined order corresponding the region of destination of the computer 10, that is, the region where the computer 10 is used. Thereby, it is possible to more quickly determine the filtering characteristic which enables the video decoder 203 to detect the vertical sync signal, horizontal sync signal and color sub-carrier signal.

Next, a specific procedure of the broadcast standard determination process, which is executed by the CPU 111, is described.

The broadcast standard determination process is executed while successively varying the frequency band (tuning frequency) of the broadcast signal that is to be received by the tuner 201. In this embodiment, a search is started from the lower-limit frequency (41 MHz) of the VHF band.

To begin with, the tuner control program, i.e. CPU 111, sets the filtering characteristic corresponding to the broadcast system B in the IF demodulator 202 (block S101). The tuner 201 executes an automatic frequency tuning, and finely adjusts the frequency band of a broadcast signal to be received (block S102). An intermediate-frequency signal that is output from the tuner 201 is demodulated by the IF demodulator 202. Thereby, a CVBS signal (video signal) and a SIF signal (audio signal) are obtained. The CVBS signal (video signal) and SIF signal (audio signal) are sent to the video decoder 203 and audio decoder 204, respectively.

The video decoder 203 executes a sync signal determination process for detecting the frequencies of a horizontal sync signal, a vertical sync signal and a color sub-carrier signal. In this case, the video decoder 203 generates, using, e.g. PLL (Phase-Locked Loop), signals that are synchronized with a horizontal sync signal, a vertical sync signal and a color sub-carrier signal which are included in the CVBS signal.

The tuner control program, i.e. CPU 111, read-accesses, e.g. a status register in the video decoder 203, thus referring to the detection result of the horizontal sync signal, vertical sync signal and color sub-carrier signal by the video decoder 203. Then, the tuner control program, i.e. CPU 111, determines whether the video decoder 203 has correctly detected the frequencies of the horizontal sync signal, vertical sync signal and color sub-carrier signal, that is, whether the video decoder 203 has been locked with the horizontal sync signal, vertical sync signal and color sub-carrier signal (block S103, S105).

If the sync signal determination process fails, that is, if the video decoder 203 fails to be locked with any one of the horizontal sync signal, vertical sync signal and color sub-carrier signal (NO in block S103, or NO in block S105), the tuner control program, i.e. CPU 111, successively changes the filtering characteristic, which is set in the demodulator 202, until the sync signal determination process is successfully executed, for example, in an order of the filtering characteristic corresponding to the system B, the filtering characteristic corresponding to the system M and the filtering characteristic corresponding to the system L (L').

If the sync signal determination process has failed with respect to all the kinds of filtering characteristics (YES in block S104), the tuner control program, i.e. CPU 111, increases the tuning frequency by 1 level (+1 MHz) (block S106), and repeats the process of blocks S101 to S105.

If the sync signal determination process is successfully executed (YES in block S105), the tuner control program, i.e. CPU 111, executes a color system determination process and an audio system determination process (block S107, S109).

In the color system determination process (block S107), the tuner control program, i.e. CPU 111, determines the color system corresponding to the broadcast signal that is being received by the tuner 201, on the basis of the frequencies of the horizontal sync signal, vertical sync signal and color sub-carrier signal detected by the video decoder 203.

Basically, the kind of broadcast standard (TV broadcast standard) corresponding to the currently received broadcast signal is determined on the basis of the relationship between the kind of color system and the kind of broadcast system corresponding to the filtering characteristic with which the sync signal determination process has successfully been executed. The kind of color system is determined based on the frequencies of the horizontal sync signal, vertical sync signal and color sub-carrier signal detected by the video decoder 203. However, depending on the broadcast standard, it is necessary to consider the kind of audio system, too. Thus, in the present embodiment, the audio system determination process (S109) is also executed. In the audio system determination process (S109), the tuner control program determines the audio system corresponding to the currently received broadcast signal, in accordance with the frequency of the audio carrier signal that is detected by the audio decoder 204.

If the combination of the frequency of the horizontal sync signal, the frequency of the vertical sync signal and the frequency of the color sub-carrier signal, which are detected by the video decoder 203, corresponds to none of the color systems, the tuner control program, i.e. CPU 111, judges that the color system is non-determinable (NO in block S108), and determines that the kind of the broadcast standard of the currently received broadcast signal is a broadcast standard that is preset as a default broadcast standard (block S114). The default broadcast standard is a broadcast standard corresponding to the region of destination of the computer 10. Also in the case where the audio system is non-determinable (NO in block S110), the tuner control program, i.e. CPU 111, determines that the kind of the broadcast standard of the currently received broadcast signal is the default broadcast standard (block S114).

If both the color system determination and audio system determination are successfully executed, the tuner control program, i.e. CPU 111, determines the kind of the broadcast standard of the currently received broadcast signal, on the basis of the kind of the broadcast system corresponding to the filtering characteristic with which the sync signal determination process is successfully executed, the determined kind of the color system, and the determined kind of the audio system (block S111).

Thereafter, the TV application program, i.e. CPU 111, stores a pair of the current tuning frequency and the determined kind of broadcast standard in the memory 113 as channel map information (block S112). The channel map information is information that defines the kind of a receivable broadcast standard for each frequency channel.

The above-described series of processes are repeated until the tuning frequency to be checked reaches the upper limit (e.g. 870 MHz) of the TV broadcast frequency band, while the tuning frequency to be checked is varied. Thereby, channel map information, which defines the presence/absence of a receivable broadcast signal in each frequency band and the kind of a receivable broadcast standard in each frequency band, can be generated. If the user selects the channel for viewing/listening, the TV application program, i.e. CPU 111, sets various parameters for receiving the broadcast standard, which corresponds to the selected channel, in the TV tuner/capture unit 123.

Figure 8:
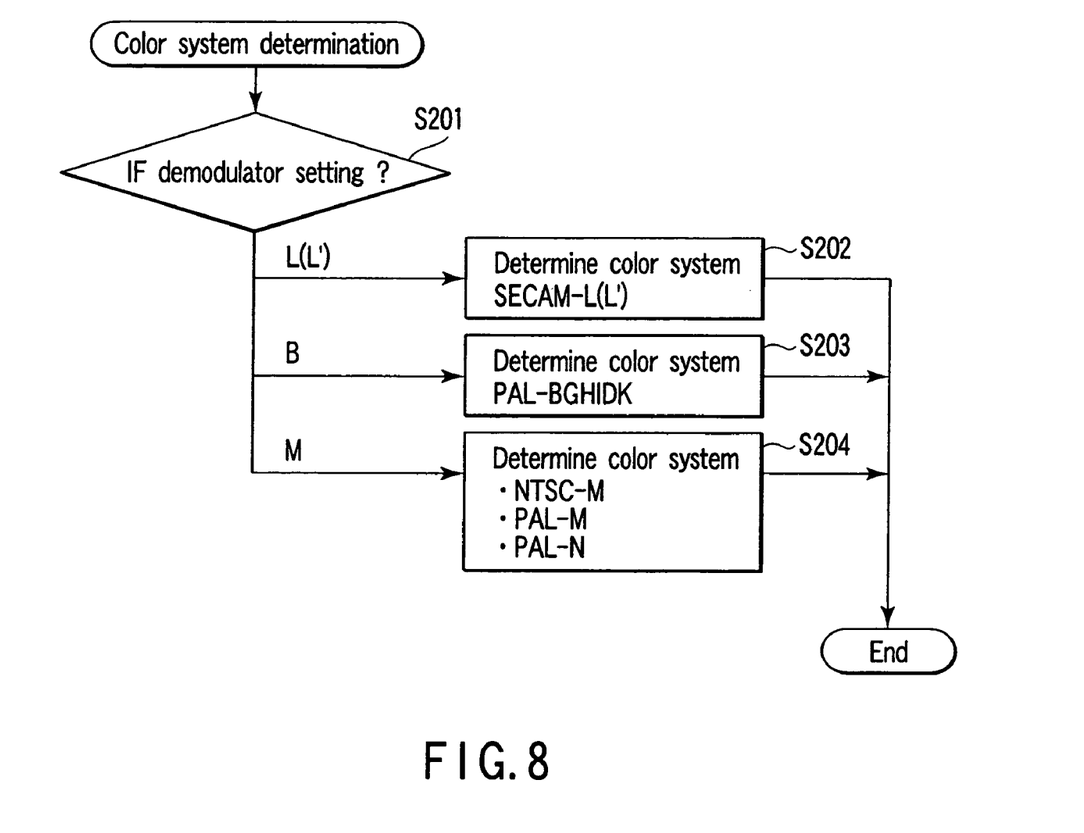
FIG. 8 is an exemplary flow chart for illustrating an example of the procedure of a color system determination process which is executed by the computer shown in FIG. 1.

FIG. 8 shows the procedure of the color system determination process.

The tuner control program, i.e. CPU 111, determines which of the broadcast systems M, B and L (L') corresponds to the filtering characteristic, with which the sync signal determination process is successfully executed (block S201).

If the filtering characteristic, with which the sync signal determination process is successfully executed, is the filtering characteristic corresponding to the broadcast system L (or L'), a candidate for the broadcast standard corresponding to the currently received broadcast signal is SECAM-L (L'). Thus, the tuner control program, i.e. CPU 111, determines whether the color system of the currently received broadcast signal is SECAM or not, on the basis of the frequencies of the horizontal sync signal, vertical sync signal and color sub-carrier signal that are detected by the video decoder 203.

If the filtering characteristic, with which the sync signal determination process is successfully executed, is the filtering characteristic corresponding to the broadcast system B, the candidates for the broadcast standard corresponding to the currently received broadcast signal are PAL-B, PAL-G, PAL-H, PAL-I, PAL-D and PAL-K. Thus, the tuner control program, i.e. CPU 111, determines whether the color system of the currently received broadcast signal is PAL or not, on the basis of the frequencies of the horizontal sync signal, vertical sync signal and color sub-carrier signal that are detected by the video decoder 203 (block S203).

If the filtering characteristic, with which the sync signal determination process is successfully executed, is the filtering characteristic corresponding to the broadcast system M, the candidates for the broadcast standard corresponding to the currently received broadcast signal are NTSC-M, PAL-M and PAL-N. Thus, the tuner control program, i.e. CPU 111, determines whether the color system of the currently received broadcast signal is NTSC or PAL, on the basis of the frequencies of the horizontal sync signal, vertical sync signal and color sub-carrier signal that are detected by the video decoder 203 (block S203).

Figure 9:
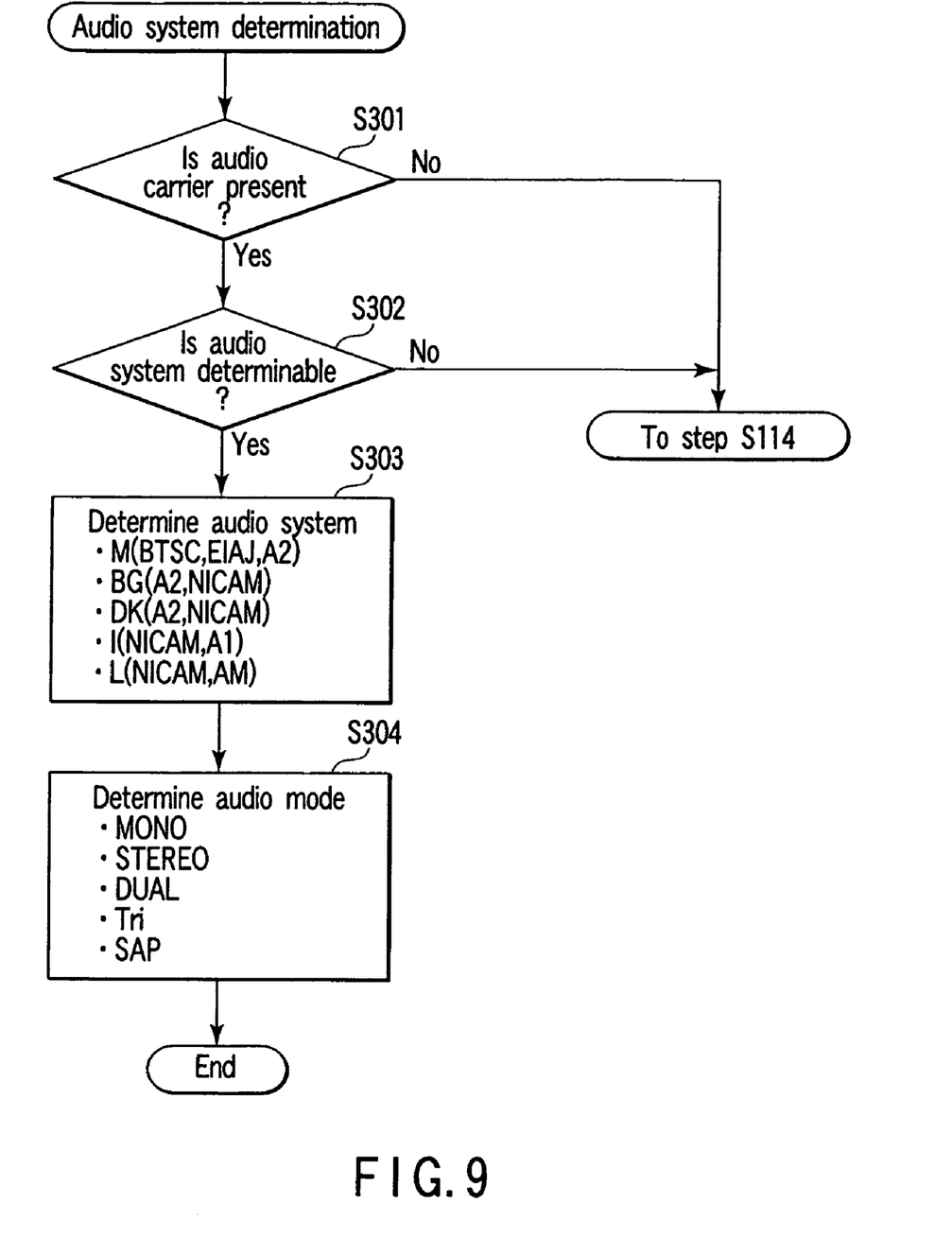
FIG. 9 is an exemplary flow chart for illustrating an example of the procedure of an audio system determination process which is executed by the computer shown in FIG. 1.

FIG. 9 shows an example of the procedure of the audio system determination process.

The tuner control program, i.e. CPU 111, determines whether the audio carrier frequency is normally detected by the audio decoder 204, on the basis of the detection result of the audio carrier frequency by the audio decoder 204 (block S301, S302). If the audio carrier frequency is not normally detected (NO in block S301, or NO in block S302), the tuner control program, i.e. CPU 111, goes to block S114 in FIG. 7.

If the audio carrier frequency is normally detected (YES in block S302), the tuner control program, i.e. CPU 111, determines the kind of the audio system on the basis of the detected audio carrier frequency (block S303). In addition, the tuner control program determines, where necessary, the audio mode (monaural, stereo) of the audio signal included in the currently received broadcast signal, on the basis of the decoded result of the audio signal by the audio decoder 204 (block S304).

As has been described above, according to the present embodiment, the process for setting the filtering characteristic which enables a normal CVBS signal to be output, in the IF demodulator 202 is first executed, following which the color system determination process and audio system determination process are executed. Thus, even in a region where services using TV broadcast signals corresponding to a plurality of kinds of broadcast standards are provided, it is possible to obtain a normal CVBS signal. Accordingly, the video decoder 203 can correctly detect the frequencies of the horizontal sync signal, vertical sync signal and color sub-carrier signal, and the precision in determining the broadcast standard can be enhanced.

In the present embodiment, no special hardware is needed for the broadcast standard determination. Thus, the receivable broadcast standard can automatically be determined for each frequency band only by a software control, without the need to alter the hardware structure of an ordinary tuner device that is configured to receive a broadcast signal corresponding to a broadcast standard that is selected by the user.

In this embodiment, the personal computer including the TV tuner/capture unit has been exemplified as an electronic apparatus that can receive a broadcast signal. However, the broadcast standard determination function of this embodiment is also applicable to ordinary TV receivers.

Furthermore, the function of the tuner control program, i.e. the function of the filtering characteristic control unit and the function of the broadcast determination unit, may be realized by a 1-chip microcomputer that is mounted on the TV tuner/capture unit.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a receiver which receives a broadcast signal of a predetermined frequency band;

a demodulator which filters the received broadcast signal using a filtering characteristic which is set in the demodulator, and separates the received broadcast signal into a video signal and an audio signal;

a video decoder which executes a process for detecting frequencies of a vertical sync signal, a horizontal sync signal and a color sub-carrier signal which are included in the video signal which is output from the demodulator;

a filtering characteristic control unit which refers to a result of the detecting process by the video decoder, while changing the filtering characteristic set in the demodulator among a plurality of kinds of filtering characteristics corresponding to a plurality of kinds of broadcast systems, thereby selecting, from the plurality of kinds of filtering characteristics, a filtering characteristic which enables the video decoder to detect the vertical sync signal, the horizontal sync signal and the color sub-carrier signal; and a broadcast standard determination unit which determines the kind of the broadcast standard corresponding to the received broadcast signal, based on the selected kind of filtering characteristic and the frequencies of the vertical sync signal, the horizontal sync signal and the color sub-carrier signal which are detected by the video decoder.

2. The electronic apparatus according to claim 1, wherein the filtering characteristic control unit is configured to successively change the filtering characteristic, which is set in the demodulator, among the plurality of kinds of filtering characteristics, until the frequencies of the vertical sync signal, the horizontal sync signal and the color sub-carrier signal are detected by the video decoder.

3. The electronic apparatus according to claim 1, wherein the filtering characteristic control unit is configured to successively change the filtering characteristic, which is set in the demodulator, in a predetermined order corresponding to a region where the electronic apparatus is used.

4. The electronic apparatus according to claim 1, further comprising an audio decoder which detects a frequency of an audio carrier signal which is included in the audio signal that is output from the demodulator, wherein the broadcast standard determination unit is configured to determine the kind of the broadcast standard corresponding to the received broadcast signal, based on the selected kind of filtering characteristic, the frequencies of the vertical sync signal, the horizontal sync signal and the color sub-carrier signal which are detected by the video decoder, and the frequency of the audio carrier signal which is detected by the audio decoder.

5. The electronic apparatus according to claim 1, further comprising means for varying a frequency band of the broadcast signal which is to be received by the receiver.

6. A broadcast standard determination method for determining a kind of a broadcast standard corresponding to a broadcast signal which is received by a tuner device, the tuner device including a receiver which receives a broadcast signal of a predetermined frequency band; a demodulator which filters the received broadcast signal using a filtering characteristic which is set in the demodulator, and separates the received broadcast signal into a video signal and an audio signal; and a video decoder which executes a process for detecting frequencies of a vertical sync signal, a horizontal sync signal and a color sub-carrier signal which are included in the video signal which is output from the demodulator, the method comprising:

referring to a result of the detecting process by the video decoder, while changing the filtering characteristic set in the demodulator among a plurality of kinds of filtering characteristics corresponding to a plurality of kinds of broadcast systems, thereby selecting, from the plurality of kinds of filtering characteristics, a filtering characteristic which enables the video decoder to detect the vertical sync signal, the horizontal sync signal and the color sub-carrier signal; and determining the kind of the broadcast standard corresponding to the received broadcast signal, based on the selected kind of filtering characteristic and the frequencies of the vertical sync signal, the horizontal sync signal and the color sub-carrier signal which are detected by the video decoder.

7. The broadcast standard determination method according to claim 6, wherein said selecting the filtering characteristic includes successively changing the filtering characteristic, which is set in the demodulator, among the plurality of kinds of filtering characteristics, until the frequencies of the vertical sync signal, the horizontal sync signal and the color sub-carrier signal are detected by the video decoder.

8. The broadcast standard determination method according to claim 6, wherein said selecting the filtering characteristic includes successively changing the filtering characteristic, which is set in the demodulator, in a predetermined order corresponding to a region where the tuner device is used.

9. The broadcast standard determination method according to claim 6, wherein the tuner device further includes an audio decoder which detects a frequency of an audio carrier signal which is included in the audio signal that is output from the demodulator, and said determining the kind of the broadcast standard includes determining the kind of the broadcast standard corresponding to the received broadcast signal, based on the selected kind of filtering characteristic, the frequencies of the vertical sync signal, the horizontal sync signal and the color sub-carrier signal which are detected by the video decoder, and the frequency of the audio carrier signal which is detected by the audio decoder.

10. The broadcast standard determination method according to claim 6, further comprising varying a frequency band of the broadcast signal which is to be received by the receiver.

* * * * *